(12) United States Patent
Kempf et al.

(10) Patent No.: US 7,805,917 B2
(45) Date of Patent: Oct. 5, 2010

(54) COMBINE HEAD WITH CONVEYOR BELT ASSEMBLIES

(75) Inventors: Günter Kempf, Krautheim-Gommersdorf (DE); Rolf Züm, Schöntal-Westemhausen (DE); Martin Stahl, Krautheim (DE)

(73) Assignee: Deere & Company, Moline, IL (US)

( * ) Notice: Subject to any disclaimer, the term of this patent is extended or adjusted under 35 U.S.C. 154(b) by 158 days.

(21) Appl. No.: 11/430,336

(22) Filed: May 9, 2006

(65) Prior Publication Data

US 2006/0254241 A1  Nov. 16, 2006

(30) Foreign Application Priority Data

May 11, 2005  (DE)  ........................ 10 2005 021 766

(51) Int. Cl.
*A01D 43/00* (2006.01)
(52) U.S. Cl. ............................. 56/181; 56/14.5; 56/185
(58) Field of Classification Search ......... 56/14.3–14.6, 56/181–188, 364
See application file for complete search history.

(56) References Cited

U.S. PATENT DOCUMENTS

| | | | | |
|---|---|---|---|---|
| 2,608,041 | A | * | 8/1952 | Schoenrock ................ 56/14.6 |
| 4,038,809 | A | | 8/1977 | Arnould et al. |
| 4,301,644 | A | * | 11/1981 | Henderson .................. 56/14.3 |
| 4,617,787 | A | * | 10/1986 | Eguchi et al. ................ 56/14.6 |
| 2005/0022491 | A1 | * | 2/2005 | Zurn et al. ................ 56/16.4 R |

FOREIGN PATENT DOCUMENTS

| | | |
|---|---|---|
| DE | 299 10 397 | 6/1999 |
| DE | 10 2004 024232 | 5/2004 |
| EP | 1 495 665 | 7/2004 |
| GB | 1 501 639 | 12/1974 |
| GB | 1 574 033 | 4/1977 |
| GB | 1 602 067 | 5/1978 |

OTHER PUBLICATIONS

European Search Report, Aug. 3, 2006, 8 Pages.

* cited by examiner

*Primary Examiner*—Thomas B Will
*Assistant Examiner*—Mai T Nguyen

(57) ABSTRACT

The invention pertains to a combine head with a frame to which a transverse conveyor spiral is secured that extends transversely with respect to the forward direction of the combine head, where several conveyor belt assemblies are prearranged at this transverse conveyor spiral in a laterally sequential manner in the forward direction and are equipped with conveyor belts, and in the harvesting mode of operation, convey material to be harvested rearward to the transverse conveyor spiral, which in turn conveys it transversely with respect to the forward direction and toward the middle of the combine head, wherein a cover is present between adjacent conveyor belt assemblies in order to seal off the inner zones of the conveyor belt assemblies. It is proposed that the conveyor belt—that is located upstream with respect to the material to be harvested and to be transported transversely with respect to the forward direction—projects beyond the adjacent region of the cover in the conveyor belt region that is immediately adjacent to the cover.

2 Claims, 5 Drawing Sheets

COMBINE HEAD WITH CONVEYOR BELT ASSEMBLIES

FIELD OF THE INVENTION

The invention pertains to a combine head with a frame to which a transverse conveyor spiral is secured that extends transversely with respect to the forward direction of the combine head, where several conveyor belt assemblies are prearranged at the transverse conveyor spiral in a laterally sequential manner in the forward direction and are equipped with conveyor belts, and, harvesting mode of operation convey material to be harvested rearward to the transverse conveyor spiral, which in turn conveys it transversely with respect to the forward direction and toward the middle of the combine head, wherein a cover is present between adjacent conveyor belt assemblies in order to seal off the inner zones of the conveyor belt assemblies.

BACKGROUND OF THE INVENTION

Combine heads with conveyor belts have been described in GB 1 501 639 A, GB 1 574 033 A, and GB 1 602 067 A. These heads have a frame with a base, side walls, and a rear wall. A transverse conveyor spiral is arranged in front of the rear wall. Several conveyor belts arranged in a laterally sequential manner are located above the base, and between a mower bar at the front side of the base and the transverse conveyor spiral, and rotate around front and rear rollers and transport the material to be harvested and that has been cut off by the mower bar, rearward toward the transverse conveyor spiral which then delivers it in its middle region to the oblique conveyor of a harvester combine. A rotating reel is located above the mower bar and the conveyor belts and feeds the material to be harvested and that is standing upright to the mower bar. Smaller gaps remain between the belts' lateral edges adjacent to one another and are covered over at the top by roof-shaped metal covers.

A different head, with conveyor belts that rearwardly transport the material to be harvested, is described in EP 1 495 665 A, where plate-shaped covers cover over the lateral edges of the conveyor belts and the intermediate zones that remain between adjacent conveyor belts. The covers are intended to prevent the material to be harvested, or other contaminants, from penetrating the inner zone of the conveyor belt assemblies.

At the rear side of the conveyor belts in the case of the combine heads that are being described, the transverse conveyor spiral transports the material to be harvested transversely with respect to the forward direction and toward the middle of the combine head. In the case of larger throughput quantities of the material to be harvested, said material is pushed from the rear to the rear sides of the conveyor belts, and this can lead to the undesired consequence that certain quantities of material find their way between the conveyor belt located upstream relative to the material conveyance direction of the transverse conveyor spiral and the cover and thence through into the inner zone of the conveyor belts and there cause damage.

A conveyor belt is described in DE 299 10 397 U for the conveyance of bulk materials and materials comprising individual units. In order to prevent the situation in which bulk material residues find their way into the inner zone of the conveyor belt and adversely affect the conveyor belt or its securement elements and drive elements there, it is proposed that the lateral ends of the conveyor belt have a projection or a thickened region that projects outward from the surface of the conveyor belt. The problem in the case of which the material to be transported is transported transversely with respect to the conveyance direction does not present itself here, however, so that the person skilled in the art is not induced to use such a projection on a combine head of the type designated at the beginning.

SUMMARY OF THE INVENTION

The problem that forms the underlying basis of the invention is seen in the feature that a combine head with conveyor belt assemblies is to be provided for which penetration of the material to be harvested into the conveyor belt assemblies is to be feared either not at all or to a reduced extent.

In accordance with the invention, this problem is solved via the teaching of patent claim 1, wherein features are listed in the additional patent claims that further develop this solution in an advantageous manner.

It is proposed that the conveyor belt—that is located upstream with respect to the flow direction of the material to be harvested and to be transported transversely with respect to the forward direction by means of the transverse conveyor spiral—be provided with a surface that projects beyond the cover in the conveyor belt region that is immediately adjacent to the cover. In its region that is adjacent to the cover, the conveyor belt that is located upstream is, accordingly, separated farther from the axis of rotation of the rollers around which the conveyor belt rotates than the adjacent region of the cover.

In this way, the situation is achieved in which the material to be harvested flows along at an adequate distance from the cover's edge located upstream. Penetration of the material to be harvested into the inner zone of the conveyor belt assemblies is thus to be expected either not at all or only to a significantly reduced extent.

In a way that is known, it is suggested that the cover extend over the conveyor belt located downstream on the outside thereof at the side where its edge is located. Penetration of material to be harvested into the inner zone of the conveyor belt assembles at this position is not to be feared.

As has been mentioned, the conveyor belt located downstream outwardly projects beyond the cover in the region thereof that is adjacent to the cover. Various possibilities exist for realizing this spatial arrangement within the framework of the train of thought in accordance with the invention. In a first embodiment, the conveyor belt located upstream is provided, in its region adjacent to the cover, with an outwardly projecting thickened region. The material is outwardly deflected at the thickened region and cannot penetrate the gap between the conveyor belt and the cover. The cross section of the thickened region is arbitrary, e.g., rectangular. A wedge-shaped cross section of the thickened region, where this wedge-shaped cross section becomes outwardly wider in the flow direction, has proven to be especially suitable since the material to be harvested is deflected in a successive manner. In addition, the situation is avoided in which material accumulates at the thickened region as could be the case at outwardly projecting edges.

In the case of another possible embodiment, the cover has a section that is displaced inward with respect to the adjacent region of the conveyor belt located upstream. Here, accordingly, this displacement is realized via a suitable shape of the cover that can become outwardly wider between its section, which is displaced inward, and the conveyor belt that is located downstream. This embodiment can also be combined with a thickened region that outwardly projects beyond the conveyor belt. It would also be possible to allow the cover to extend as far as the inside of the conveyor belt located upstream.

The cover and the conveyor belt region located upstream and projecting beyond the cover are expediently located at the rear side of the conveyor belt assemblies since especially secure sealing off appears sensible there because of the material to be harvested that has to be transported in the lateral direction via the transverse conveyor spiral. However, the lower side and/or the upper side of the conveyor belt can also be sealed off in the way that has been described.

BRIEF DESCRIPTION OF THE DRAWINGS

Two embodiments of the invention described in more detail below are illustrated in the drawings. Shown are:

FIG. 6, a rearward view of a second embodiment of two adjacent conveyor belt assemblies.

DESCRIPTION OF THE PREFERRED EMBODIMENT

Figure 1:
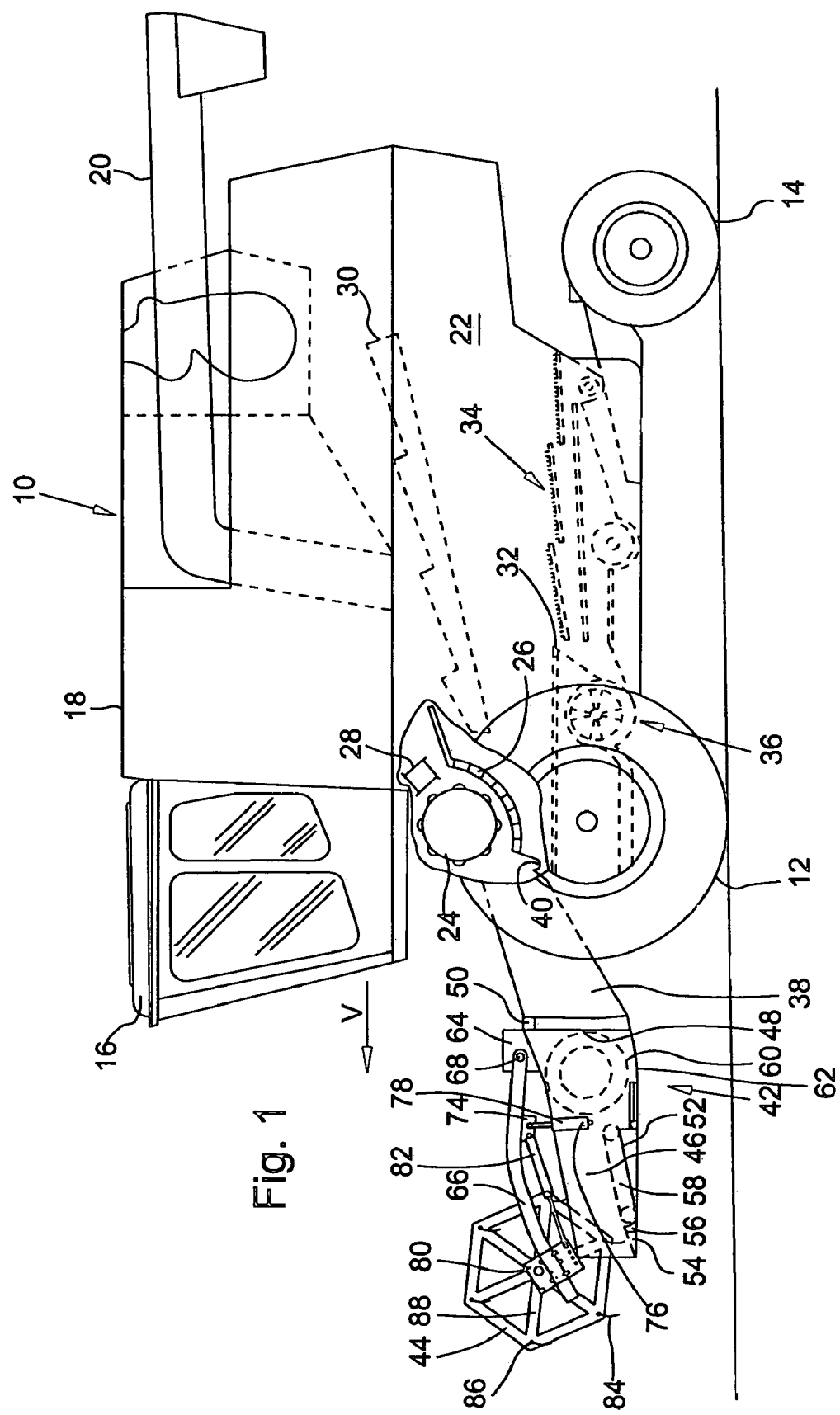
FIG. 1, a schematic lateral view of a harvesting machine with a combine head with conveyor belt assemblies.

A harvesting machine 10 shown in FIG. 1 in the form of a harvesting combine is supported on wheels 12 or 14 that are forwardly driven and rearwardly steerable, and it has a driver's cabin 16 from which it can be operated by a driver. A grain tank 18 follows on in the rearward direction from the driver's cabin 16 and can release the material delivered to it to the outside via an emptying pipe 20. The grain tank 18 is mounted on a frame 22 in which material fed into it is subdivided on its way into its large and small components via a threshing drum 24, a threshing basket 26, and a spiral drum 28. Additional separation of the harvested material is carried out on shakers 30, which follow on therefrom, and also on a preparatory base 32 and on sieves 34, wherein the completely threshed material fraction is finally conveyed into the grain tank 18, and the large components of the harvested material are deposited on the base via the shakers 30, and the light components are blown, likewise onto the base, from the sieves 34 by means of a blower 36. Material lying or standing upright on the base is fed to the threshing drum 24 via an oblique conveyor 38 and a rock collecting tray 40, after it has been picked up from the base by means of a device in the form of a combine head 42 for picking up harvested material. As a prelude to the embodiments below, it is to be stated that direction-related data in the following sections, such as in front of, behind, above, and below, pertain to the forward direction V of the harvesting machine 10.

The combine head 42 comprises a frame that consists of side walls 46, a rear wall 48 with a transverse support 50 that is arranged at the top side thereof, and a base 52. The central region of the transverse support 50 is detachably suspended from the oblique conveyor 38 by suitable means, e.g., hooks. A blade-carrying bar 54 with knives that move back and forth is arranged at the front side of the base 52. An incline 56, which extends across the breadth of the combine head 42 and which slopes slightly downward toward the rear, is located in the forward direction V behind the blade-carrying bar 54.

Lateral tips or lateral combine heads can be installed at the front side of the side walls 46.

Several conveyor belt assemblies 58, which are arranged laterally next to one another, follow on behind the incline 56, and are associated with a conveyor device, which extends rearwardly and oppositely to the forward direction V. A transverse conveyor spiral 60 is provided behind this conveyor device, it extends transversely with respect to the forward direction V and it is assembled from a pipe 61 with conveying spirals 63 welded thereto. Controlled fingers 65, for hauling in material, are provided in the central region of the pipe (see FIG. 2). The conveyor belt assemblies 58 slope slightly upwardly and rearwardly. Metal base plates 52 are located at their lower side and have been adapted, in terms of their shape, to the conveyor belt assemblies 58 and to the transverse conveyor spiral 60.

A reel 44, which is capable of being driven and which is installed on the frame in a height adjustable manner and in a manner in which it is capable of being moved in the forward direction, is located above the blade-carrying beam 54 and the conveyor belt assemblies 58, and it extends transversely with respect to the forward direction V. A console 64 is welded to each of the two lateral ends of the frame of the combine head 42, namely above and in front of the transverse support 50, and a reel support arm 66, which is capable of swiveling about an axis 68 that extends horizontally and transversely with respect to the forward direction V, is mounted on each of the aforementioned consoles. In order to swivel the reel support arm 66 about the axis 68, a vertical adjustment drive system 78 in the form of a hydraulic cylinder extends between a retaining unit 76, which is installed on the side wall 46, and a console 74 that is welded to the reel support arm 66 below the first bend 70.

At its two ends, the reel 44 is mounted in a rotatable manner on a reel retaining unit 80. The reel retaining unit 80, for its part, is supported in a movable manner on the reel support arm 72 in question. A horizontal adjustment drive system 82 in the form of a hydraulic cylinder extends between the reel retaining unit 80 and the console 74.

The reel 44 can be made to rotate about its longitudinal axis by means of a hydraulic motor not illustrated in the figures, and preferably arranged at the end of the reel that is located on the right in the forward direction. In the harvesting mode of operation, the reel rotates counterclockwise as viewed in FIG. 1.

The reel is equipped with six prong supports 86 that are secured to supporting star shaped units 88 and that carry prongs 84 that are respectively arranged next to one another. The position of the prong supports and that of the prongs 84 during the rotation of the reel 44 is varied by means of conventional control mechanisms, so that at all times, the prongs 84 extend approximately downward from the prong supports and slightly toward the rear. The position of the prongs 84 is preferably adjustable.

Covers 90 are arranged above the intermediate regions and between the conveyor belt assemblies 58. Similar covers 92 are also located between the side walls 46 and the outwardly arranged conveyor belt assemblies 58. The covers 90, 92 are secured in a detachable manner, preferably by means of screw-threaded bolts. They prevent accumulation of harvested material and other contaminants from occurring in the inner zone of the conveyor belt assemblies 58.

Figure 3:
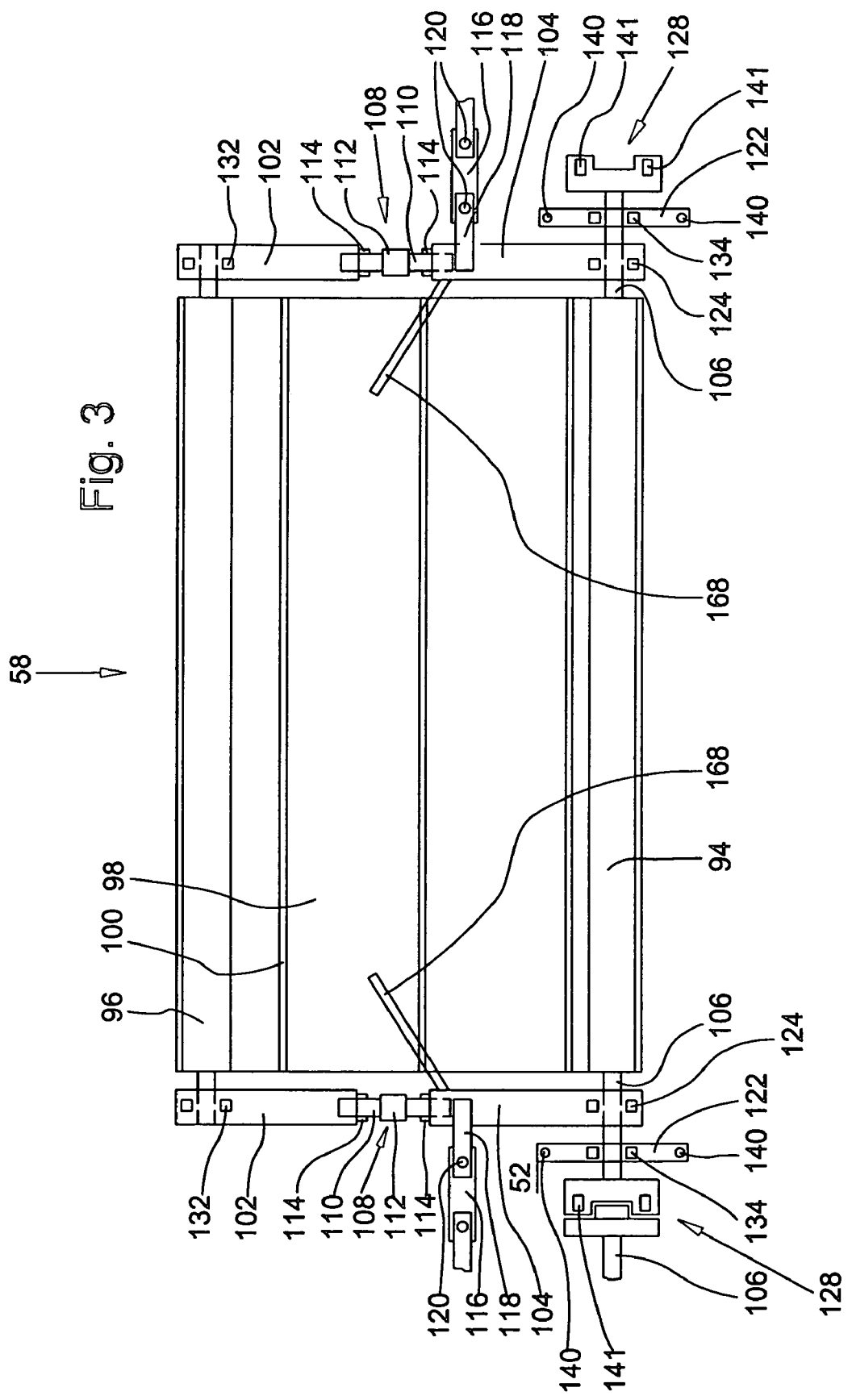
FIG. 3, a plan view of a conveyor belt assembly.

FIG. 3 shows an individual conveyor belt assembly 58 in detailed form. It comprises a first, rear, circularly cylindrical roller 94 and a second, front, circularly cylindrical roller 96 around which a continuous conveyor belt 98 rotates that is equipped with flights 100 with a rectangular cross section that project outward. The surface between the flights 100 is smooth in the embodiment that is illustrated. In the case of other embodiments, one could also select other surfaces, e.g., roughened ones or ones that are corrugated, along with other cross-sectional shapes and separations of the flights 100. The conveyor belt 98 comprises a flexible material, such as rubber or a suitable synthetic material.

The conveyor belt assembly 58 additionally comprises a retaining frame that consists of two front retaining elements 102 and two rear retaining elements 104. At each of its two ends, the front roller 96 is mounted in a rotatable manner in a front retaining element 102. In an analogous manner, the rear roller 94 is equipped at each of its two ends with a shaft 106 extending through the two rear retaining elements 104 and mounted in a rotatable manner therein. The shaft 106 can be continuous, i.e., the roller 94 is pushed onto the shaft 106, or it can consist merely of lateral stubs extending only as far as end washers at which the hollow roller 94 is supported. The mounting of the front roller 96 on the front retaining element 102 takes place by means of roller bearings 132, and that of the shaft 106 of the rear roller 96 on the rear retaining element 104 by means of roller bearings 124.

The front retaining elements 102 are in each case connected to the rear retaining elements 104 by means of an adjustment mechanism 108 in order to be able to adjust the tension of the conveyor belt 94 and in order to achieve rectilinear tracking of the conveyor belt 94. The adjustment mechanism 108 comprises screw-threaded rods 110 with oppositely cut screw threads that, in each case, extend into the retaining elements 102, 104. A hexagon 112 installed rigidly on it permits rotation of the screw-threaded rod 110 and hence drawing apart and drawing together of the retaining elements 102, 104. Lock nuts 114 permit the screw-threaded rod 110 to be fixed to the retaining elements 102, 104, so that rigid securement of the retaining elements 102, 104 to one another becomes possible. It would be conceivable to provide the adjustment mechanism 108 with a sealing system, comprising a labyrinth, for the retaining elements 102, 104.

As a rule, the two front retaining elements 102 are connected to one another by means of a transverse strut that has not been drawn in FIG. 3. Another transverse strut also preferably connects the two rear retaining elements 104 of the conveyor belt assembly 58.

Support of the retaining elements 102, 104 on the frame of the combine head 42 takes place at four positions. When considered in the forward direction V, a front retaining block 116 is secured to the frame approximately in the middle of the conveyor belt assembly 58, namely between two adjacent conveyor belt assemblies 58 or between a side wall 46 and the conveyor belt assembly 58 that is arranged next to the side wall. A strut 118, which is fixed in position on the upper side of the rear retaining element 104, extends laterally outward therefrom and adjoins the upper side of the front retaining block 116 where it is secured in a detachable manner by means of a screw 120.

Moreover, rear retaining blocks 122, which extend in the forward direction V, are secured to the frame 52 in the vicinity of the rear end of the rear retaining element 104. The shafts 106 of the rear rollers 94 extend through the roller bearings 124, which are arranged in corresponding openings in the rear retaining elements 104, and are also mounted in roller bearings 134 that are located in associated openings in the rear retaining blocks 122. The shafts 106 extend outward beyond the rear retaining blocks 122. The securement of the rear retaining elements 104 to the frame 52 takes place via the roller bearings 124, the shaft 106, the roller bearings 134, and, finally, the retaining blocks 122.

In this way, the rear retaining elements 104 are mounted on the shaft 106 in a manner that permits rotation about the longitudinal axis of this shaft, namely by means of the roller bearings 134, and after removing the screws 120 from the front retaining blocks 116, this permits the conveyor belt assembly 58 to be swiveled, in its entirety, upwardly about the axis of rotation of the shafts 106. The adjacent covers 90, 92 are to be removed beforehand by removing screws that hold the covers 90, 92 on the retaining blocks 116, 122 and on the incline 56. Cleaning and servicing tasks are significantly facilitated in the case of conveyor belt assemblies 58 that swivel upwardly.

The conveyor belts 98 are driven by a toothed wheel 136 that is driven mechanically from the harvesting machine 10. The toothed wheel 136 drives the rear roller 94 of the left conveyor belt assembly 58 via a claw coupling mechanism 128 and the left shaft 106 of this conveyor belt assembly 58. The rear roller 94 of the left conveyor belt assembly 58 in turn drives the left shaft 106 of the central conveyor belt assembly 58 via its other shaft 106 and an additional claw coupling mechanism 128, and this conveyor belt assembly is in turn connected in the same way to the right conveyor belt assembly 58 in a manner that permits drive to take place. Each claw coupling mechanism 128 comprises two halves that are each provided with claws that engage with the claws of the other half. Damping elements 141, which comprise an inherently elastic material, are arranged between the claws of the halves in order to be able to level out peaks in the drive moment, e.g., during the start-up phase.

On the inside of the upper strand of the conveyor belts 98, reaper cleaners 168 (see FIG. 3) are laterally located at each end and remove contaminants from the conveyor belt 98 and release them to the outside.

Figure 2:
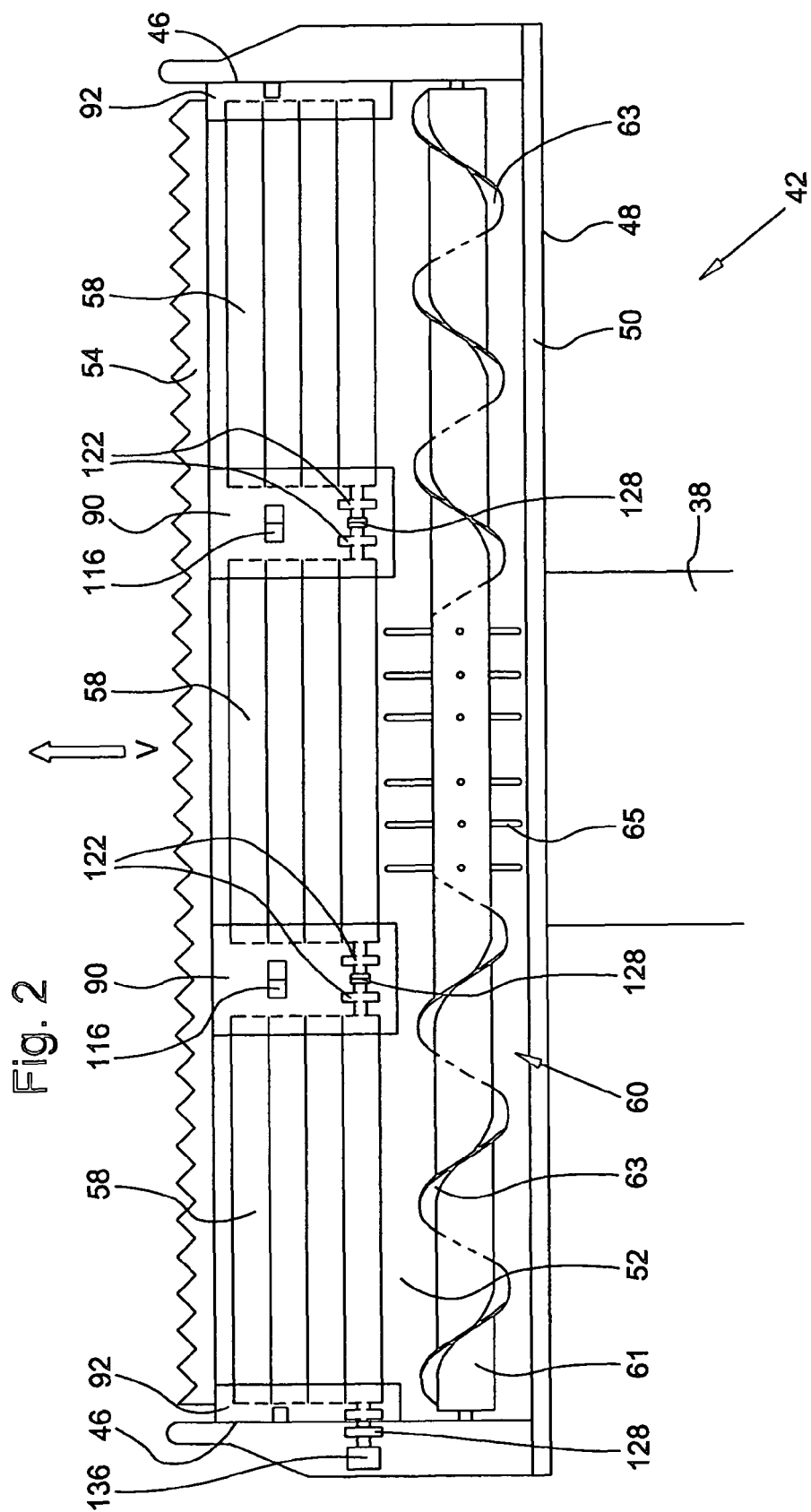
FIG. 2, a plan view of the combine head.
Figure 4:
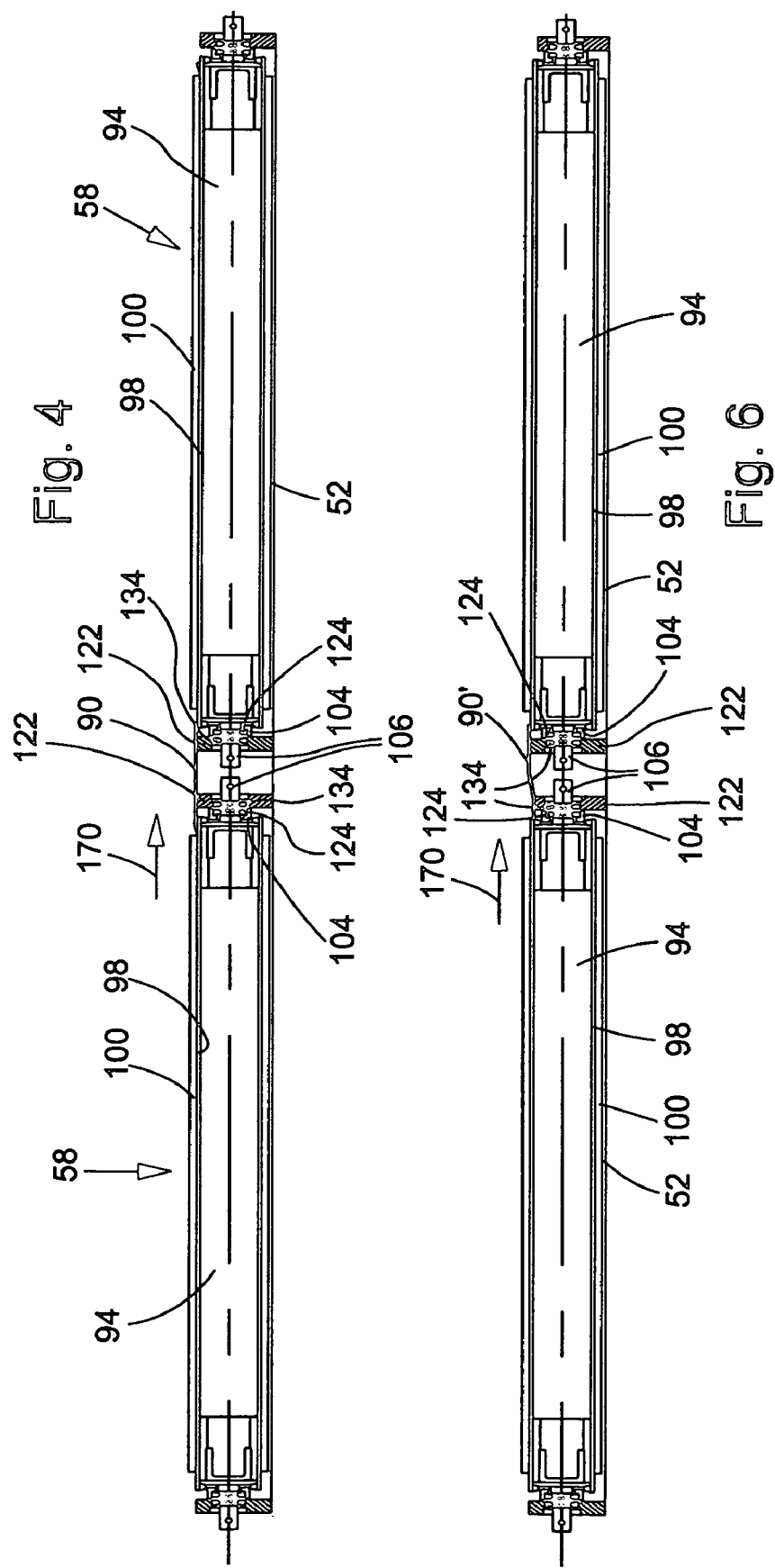
FIG. 4, a rearward view of a first embodiment of two adjacent conveyor belt assemblies.
Figure 5:
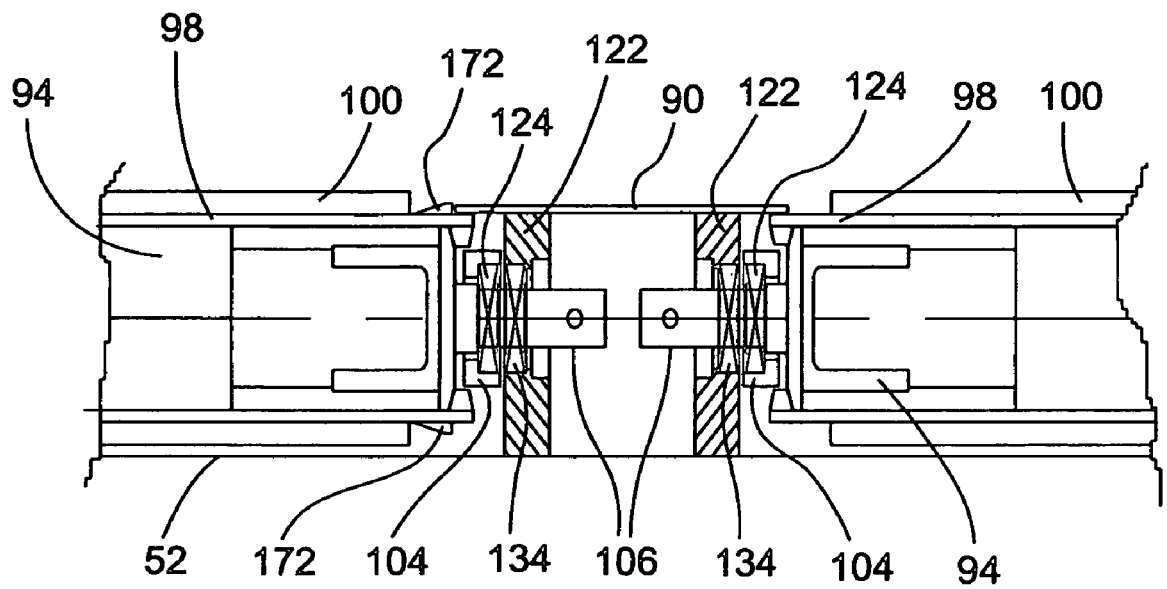
FIG. 5, an enlarged section from FIG. 4.

Two adjacent conveyor belt assemblies 58, which are drawn in on the left and in the middle in FIG. 2, are illustrated in the form of a rearward view in FIG. 4. FIG. 5 shows an enlarged section from FIG. 4. The material to be harvested is transported in the direction of the arrow 170 by means of the transverse conveyor spiral 60. A sealing arrangement, which is arranged symmetrically in regard to FIGS. 4 and 5, is located between the conveyor belt assemblies 58 drawn in on the right and in the middle in FIG. 2.

In order to prevent the situation in which the material to be harvested penetrates the gap between the conveyor belt 98 located upstream and drawn in on the left in FIG. 5 and the cover 90 and that gives rise to damage in the inner zone of the conveyor belt assemblies 58, the conveyor belt 98 located upstream is provided with a thickened region 172 that is located in the flow direction of the material to be harvested, namely between the flights 100 and the cover 90. The thickened region 172 has a triangular cross section and becomes wider, in a wedge-shaped manner, toward the outside and in the flow direction characterized by the arrow 170. The cover 90 that follows in the flow direction immediately adjoins the thickened region 172 and covers over the top of the following end region of the conveyor belt 98 in the flow direction. The cover 90 surrounds the upper section of the conveyor belts 98 from above, and it covers the conveyor belt 98 rearward regions that face the transverse conveyor spiral 60 in a semi-circular manner.

The surface of the thickened region 172, which outwardly projects (i.e., upwardly and rearwardly) beyond the adjacent cover 90, brings about the situation in which the material to be harvested is deflected toward the outside and cannot penetrate the gap between the cover 90 and the conveyor belt 98.

The cover 90 also covers over the upstream end region of the conveyor belt 98 of the conveyor belt assembly 58 that is located downstream and that is drawn in on the right in FIG. 5. Penetration of the material to be harvested into the inner zone of the conveyor belt assemblies 58 is not to be feared there, since there is no open gap between the cover 90 and the conveyor belt 98 in the flow direction of the material to be harvested.

Figure 7:
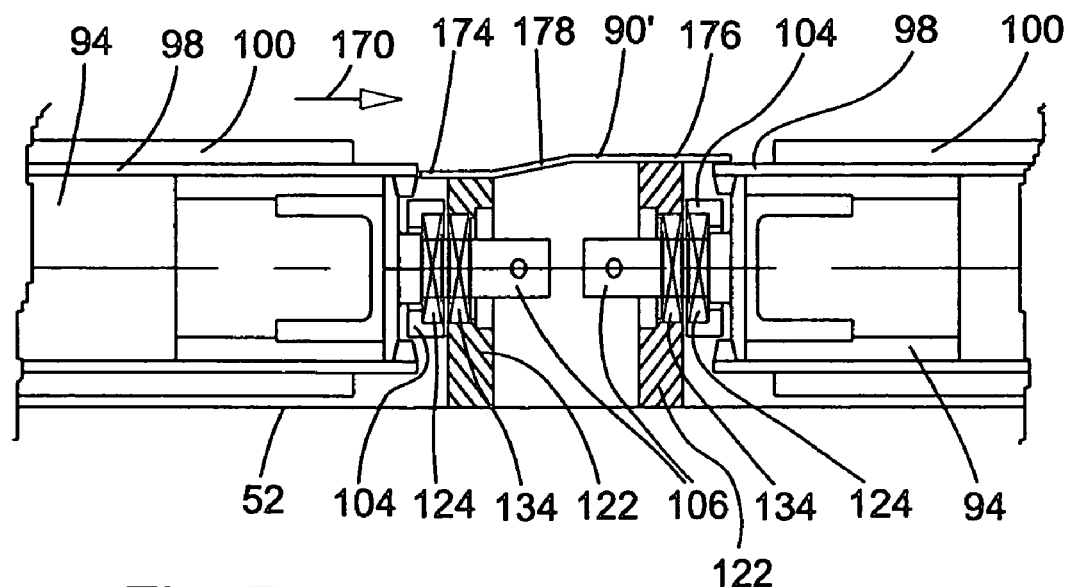
FIG. 7, an enlarged section from FIG. 6.

FIGS. 6 and 7 show a rearward view of a second embodiment of conveyor belt assemblies 58. Elements that correspond to those of the first embodiment are characterized by the same reference numbers.

The second embodiment differs from the first embodiment (FIGS. 4 and 5) by virtue of the different shape for the cover 90' that comprises an upstream section 174 a downstream section 176 and a transition region 178 located between them.

The upstream section 174 of the cover 90' is displaced inward relative to the adjacent region of the conveyor belt 98 located upstream of it, so that the conveyor belt 98 projects outwardly (i.e., upwardly and rearwardly) beyond the section 174, and this makes it difficult for material to be harvested to penetrate the gap between the cover 90' and the conveyor belt 98. The retaining block 122, which is drawn in on the left in FIG. 7, is arranged lower relative to the other retaining block 122, in order to permit movement between the conveyor belt 98 and the section 174 of the cover 90'. In the transition section 178, the cover 90' extends obliquely upward in the flow direction of the material to be harvested, as indicated by the arrow 170, whereas it is oriented horizontally in the downstream region and it outwardly covers laterally over the end of conveyor belt 98 of the downstream conveyor belt assembly 58. Here also, the cover 90' surrounds the upper section of the conveyor belts 98 from above in the manner that is illustrated in FIG. 7, and it covers over the rearward regions, which face the transverse conveyor spiral 60, of the conveyor belt 98 in a semicircular manner.

Having described the preferred embodiment, it will become apparent that various modifications can be made without departing from the scope of the invention as defined in the accompanying claims.

The invention claimed is:

1. A cutting unit with a frame to which a transverse conveyor spiral is secured that extends transversely relative to a forward direction of the cutting unit, where several conveyor belt assemblies are pre-arranged at this transverse conveyor spiral in a laterally sequential manner in the forward direction and are equipped with conveyor belts, and in the harvesting mode of operation, convey material to be harvested rearward to the transverse conveyor spiral, which spiral in turn conveys it transversely relative to the forward direction and toward the middle of the cutting unit, wherein a cover is present between adjacent conveyor belt assemblies in order to seal off a plurality of inner zones of the conveyor belt assemblies, characterized in that an upstream conveyor belt, located upstream of the cover relative to the material to be harvested, which is to be transported transversely relative to the forward direction, extends beyond the cover in a region of the upstream conveyor belt that is immediately adjacent to the cover, and a downstream conveyor belt, located downstream of the cover, does not extend beyond the cover in a region of the downstream conveyor belt that is immediately adjacent to the cover, wherein the cover has an elongate downstream-most edge that extends in the direction of movement of the downstream conveyor belt, and further wherein no portion of the downstream conveyor belt that is immediately adjacent to and downstream of the downstream-most edge of the cover extends beyond the downstream-most edge, wherein the cover comprises a section that is inwardly displaced relative to the region of the upstream conveyor belt that is adjacent to the cover and characterized in that the downstream-most edge of the cover extends upward beyond the upstream-most edge of the cover.

2. A cutting unit with a frame to which a transverse conveyor spiral is secured that extends transversely relative to a forward direction of the cutting unit, where several conveyor belt assemblies are pre arranged at this transverse conveyor spiral in a laterally sequential manner in the forward direction and are equipped with conveyor belts, and in the harvesting mode of operation, convey material to be harvested rearward to the transverse conveyor spiral, which spiral in turn conveys it transversely relative to the forward direction and toward the middle of the cutting unit, wherein a cover is present between adjacent conveyor belt assemblies in order to seal off the inner zones of the conveyor belt assemblies, characterized in that an upstream conveyor belt, located upstream of the cover relative to the material to be harvested, which is to be transported transversely relative to the forward direction, extends beyond the cover in a region of the upstream conveyor belt that is immediately adjacent to the cover, wherein the upstream conveyor belt is provided with an outwardly projecting thickened region in the region of the upstream conveyor belt that is adjacent to the cover and further wherein the thickened region has a wedge-shaped cross section that becomes outwardly wider in a transverse flow direction characterized in that the downstream-most edge of the cover extends upward beyond the upstream-most edge of the cover.

* * * * *